United States Patent
Tilleman et al.

(10) Patent No.: US 6,762,876 B2
(45) Date of Patent: Jul. 13, 2004

(54) OPTICAL CONVERTER WITH A DESIGNATED OUTPUT WAVELENGTH

(75) Inventors: Michael M. Tilleman, Kfar Sava (IL); Avigdor Huber, Yehud (IL)

(73) Assignee: Terraop Ltd., Magshimim (IL)

( * ) Notice: Subject to any disclaimer, the term of this patent is extended or adjusted under 35 U.S.C. 154(b) by 180 days.

(21) Appl. No.: 10/003,146

(22) Filed: Nov. 15, 2001

(65) Prior Publication Data

US 2002/0135865 A1 Sep. 26, 2002

Related U.S. Application Data

(60) Provisional application No. 60/249,443, filed on Nov. 20, 2000.

(51) Int. Cl.[7] .............................. G02F 1/39; G02F 1/35
(52) U.S. Cl. ....................................... 359/330; 359/326
(58) Field of Search .................. 385/24; 359/326–332; 398/79, 82

(56) References Cited

U.S. PATENT DOCUMENTS

| | | | | |
|---|---|---|---|---|
| 3,636,356 A | * | 1/1972 | Giordmaine | 398/201 |
| 4,933,944 A | | 6/1990 | McGraw | 372/18 |
| 4,935,931 A | | 6/1990 | McGraw | 372/18 |
| 5,031,234 A | * | 7/1991 | Primas et al. | 398/154 |
| 5,070,260 A | | 12/1991 | Wong | 359/330 |
| 5,177,633 A | | 1/1993 | Wong | 359/330 |
| 5,408,556 A | | 4/1995 | Wong | 385/48 |
| 5,457,556 A | | 10/1995 | Shiragaki | 398/50 |
| 5,715,337 A | | 2/1998 | Spitzer et al. | 385/4 |
| 5,872,880 A | | 2/1999 | Maynard | 385/88 |
| 5,937,117 A | | 8/1999 | Ishida et al. | 385/24 |
| 6,038,058 A | | 3/2000 | Robinson et al. | 359/293 |
| 6,075,239 A | | 6/2000 | Aksyuk et al. | 250/229 |
| 6,088,145 A | | 7/2000 | Dickensheets et al. | 359/196 |
| 6,097,859 A | | 8/2000 | Solgaard et al. | 385/17 |
| 6,154,587 A | | 11/2000 | Okayama | 385/24 |
| 6,198,565 B1 | | 3/2001 | Iseki et al. | 359/224 |
| 6,205,267 B1 | | 3/2001 | Aksyuk et al. | 385/19 |
| 6,222,954 B1 | | 4/2001 | Riza | 385/18 |
| 6,259,835 B1 | | 7/2001 | Jing | 385/18 |
| 6,288,807 B1 | | 9/2001 | Wu et al. | 398/9 |
| 6,317,529 B1 | | 11/2001 | Kashima | 385/16 |
| 2001/0008457 A1 | | 7/2001 | Zhang | 359/238 |

OTHER PUBLICATIONS

Bishop et al. Micromirrors Relieve Communications Bottlenecks. *Photonics Spectra* 167–169 (Mar. 2000).
Press Release: OMM MEMS–based Optical Switches Pass Rigorous Telcordia Requirements. www.ommnc.com (Jul. 16, 2001).
Press Release: A World's First for Optical Switching: Live Data Traffic Switched by MEMS–bsaed Optical Switch Subsystems Delivered by OMM Inc. www.omminc.com (Mar. 26, 2000).
Press Release: Optical switches delivered by Optical Micro Machines Inc. (OMM) at the core of Siemens' TransxpressTM optical service node. Siemens demonstrates optical switching at CeBIT 2000 using optical switching subsystems from OMM Inc. www.omminc.com (Mar. 7, 2000).
Press Release: Revolutionary MEMS Optical Switch Stated to Become the Heart of Optical Communications Systems. www.omminc.com (Dec. 9, 1999).
Press Release: OMM Focuses Market Position on Midsized MEMS Photonic Switch Modules and Subsystems. www.omminc.com (Jul. 27, 2001).
website: www.omminc.com, discovered on Aug. 8, 2001, however available maybe as early as Feb. 2000 .

* cited by examiner

*Primary Examiner*—John D. Lee
(74) *Attorney, Agent, or Firm*—Mark M. Friedman

(57) ABSTRACT

An optical wavelength converter that includes an optical sum frequency generator (SFG) and an optical difference frequency generator (DFG). The SFG receives part of both an input beam and a continuous-wave (CW) beam. The DFG receives part of the input beam as well as the output of the SFG. The output of the DFG represents the signal of the input beam modulated or carried on a beam having the frequency of the CW beam. Both single-channel and multi-channel configurations are integrally realized in similar numbers of components.

32 Claims, 4 Drawing Sheets

OPTICAL CONVERTER WITH A DESIGNATED OUTPUT WAVELENGTH

CROSS-REFERENCE TO RELATED PATENT APPLICATION

The benefit, pursuant to 35 U.S.C. §119(e), of provisional U.S. Patent Application Serial No. 60/249,443, filed Nov. 20, 2000, entitled "OPTICAL CONVERTER WITH A DESIGNATED OUTPUT WAVELENGTH" is claimed, and the specification thereof is incorporated herein in its entirely by this reference.

BACKGROUND OF THE INVENTION

1. Field of the invention

The present invention relates generally to optical wavelength converters and, more specifically, to a wavelength converter that receives an optical input at an arbitrary wavelength and produces an optical output at a designated wavelength.

2. Description of the Related Art

Data transmission technology is currently undergoing the dramatic change from electrical signal-based transmission to optical signal-based transmission. The optical revolution is providing high data transmission rates using inexpensive, reliable devices. A key advantage of optical signal transmission is the ability of a single transmission line, an optical fiber, to carry a high number of optical signals at different wavelengths simultaneously without interference among the signals. Thus, a single optical fiber may carry simultaneously many "channels" of communication. Several wavelength ranges, called "bands", are currently widely used. The most promising bands are the "C" and "L" bands at 1520–1565 nanometers (nm) and 1565 to 1625 nm, respectively, due to the low absorption and dispersion of signals transmitted at wavelengths within these bands through currently available optical fiber.

A functional wide-area optical network exists as a connected set of distributed routing and switching nodes. User equipment may be connected to these nodes to receive and transmit data. Many communications must be transmitted simultaneously through a network. It is not feasible to permanently or globally allocate unique wavelengths to each user or particular node-to-node network connection. A flexible networking strategy is preferred which can tentatively and locally allocate a wavelength "channel" to a particular data transmission. This allows a particular data transmission to traverse a network utilizing immediately and locally available channels instead of being delayed until a particular channel is globally open. Such flexibility limits the number of necessary transmission lines and the costs thereof. This strategy requires that a data transmission initiated at one wavelength be seamlessly converted where necessary to another wavelength. Optimal flexibility will include intraband and interband conversion. Intraband conversion occurs when a signal of an initial wavelength is converted to a similar final wavelength such that the initial and final wavelengths lie together in a band, for example, the C band. Interband conversion occurs when the initial and final wavelengths are dissimilar such that they lie in different bands, for example, a C band signal may be converted to an L band signal.

Non-linear optical (NLO) materials which have crystalline structures that exhibit non-zero second-order nonlinear electric susceptibilities ($\chi^{(2)}$) are now available offering efficient optical frequency conversion. Supported within such materials are three wave mixing (TWM) processes whereby fundamental, second, and higher harmonic wave modes interact within the crystal so that optical energy is transferred among modes. Resulting, are such known processes as second harmonic generation (SHG), and difference frequency generation (DFG). SHG can be understood as the interaction of two pump photons resulting in a generated photon of twice the energy of a pump photon. A similar process, sum frequency generation (SFG), can be understood as the interaction of a pump photon and a signal photon resulting in a generated photon with a frequency which is the sum of the frequencies of the pump photon and signal photon. DFG can be understood as the interaction of a pump photon and a signal photon resulting in a generated photon with a frequency which is the difference of the frequencies of the pump photon and signal photon.

For efficient frequency conversion, the interacting waves of different frequencies must maintain a coherent phase relationship as they propagate the interaction length of the process supporting crystal. This is because waves of dissimilar frequency propagate along the interaction path at dissimilar velocities and so become gradually out of phase. A successful strategy for maintaining phase matching is called quasi-phase matching (QPM). It involves periodic modulation of the refractive index along the interaction length such that the harmonic fields remain in phase at the beginning of each period. A microdomain periodicity can be produced within a crystal using spatially alternating electric fields or periodic ion exchange or implantation along the axis of the interaction length in the process of manufacturing the crystal. Phase maintenance results from choosing an NLO crystal with microdomain periodicity to match the fundamental or harmonic wave to be produced in a TWM process.

Direct optical signal amplification and wavelength conversion will soon eliminate the high costs, and slow processing of optical-electro-optical (OEO) devices. OEO wavelength converters known in the art lack sufficient bandwidth to accommodate the very high switching speeds of optical networks currently under development. Therefore, there is a need for a high-bandwidth optically transparent wavelength converter utilizing direct optical-optical conversion.

SUMMARY OF THE INVENTION

The present invention relates to an optical wavelength converter that includes an optical sum frequency generator (SFG) and an optical difference frequency generator (DFG). The SFG receives part of both an input beam and a continuous-wave (CW) beam. The DFG receives part of the input beam as well as the output of the SFG. The output of the DFG represents the signal of the input beam modulated or carried on a beam having the frequency of the CW beam.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
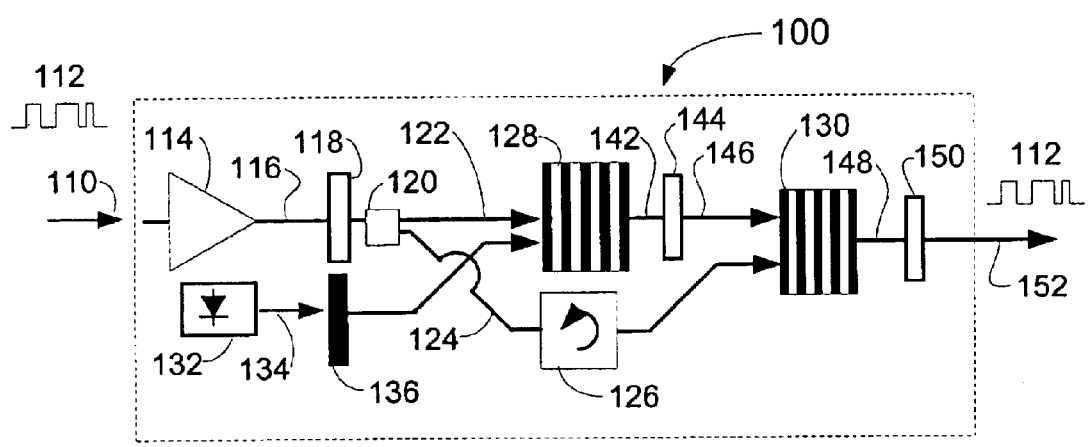
FIG. 1 is a block diagram of one embodiment of a single-channel wavelength converter.

An exemplary embodiment of the optical converter 100, as illustrated in FIG. 1, receives as input an optical signal 110. Optical signal 110 carries or is amplitude-modulated with information, such as a data pattern 112, at some suitable frequency. An optical amplifier 114 produces an amplified signal 116 at the wavelength of the optical signal 112 with data pattern 112. Optical amplifier 114 may be any suitable known device such as, for example, a semiconductor optical amplifier (SOA) or an erbium-doped fiber amplifier (EDFA). A depolarizer 118 equalizes any polarization components of amplified signal 116. A polarizing splitter 120 receives amplified signal 116 and outputs first and second split signals 122 and 124, each with data pattern 112. Split signal 122 is coupled to an input of a sum frequency generator (SFG) crystal 128, and split signal 124 is coupled through a 90-degree polarization rotator 126 to an input of a difference frequency generator (DFG) crystal 130. Crystals 128 and 130 are of a non-linear optical (NLO) noncentrosymmetric type possessing relatively high second-order susceptibility $\chi^{(2)}$. Suitable crystals 128 and 130 are well-known in the art and commercially available from a variety of sources but are nonetheless described below in further detail.

A continuous-wave (CW) optical pump beam source 132 provides a pump beam 134, which enters converter 100 through a laser-beam isolator 136. Pump beam source 132 can be, for example, a laser, a laser diode having a single fixed or predetermined frequency, a diffraction feedback laser diode, or other suitable device. Also, a vertical cavity surface emitting laser (VCSEL) array may be used with an adjoining optical amplifier to elevate the VCSEL beam power. Pump beam source 132 can be internal to converter 100 as shown in FIG. 1 or, in other embodiments of the invention, can be an input of converter 100 that receives a beam from a source external to converter 100. In another embodiment, pump beam source 13 can be a tunable laser to provide for the variable selection of the destination wavelength of the output of the wavelength converter 100.

Pump beam 134 and first split signal 122 are each coupled to SFG crystal 128. An interim signal 146 having data pattern 112 is generated within SFG crystal 128. The frequency of interim signal 146 is the sum of the frequencies of pump beam 134 and optical signal 110. This summation is expressed in terms of wavelengths as $\lambda_I^{-1}=\lambda_S^{-1}+\lambda_P^{-1}$; where $\lambda_I$ is the wavelength of interim signal 146, $\lambda_S$ is the wavelength of optical signal 110, and $\lambda_P$ is the wavelength of pump beam 134. A high-pass filter 144 removes any residual components of pump beam 134 and first split signal 122 from the output 142 of SFG crystal 128 and transmits interim signal 146. Filter 144 thus has a cutoff frequency just below or, but for the inherent filter roll-off, approximately at the frequency output by SFG crystal 128, i.e., the sum of the frequencies of input signal 110 and pump beam 134. Filter 144 and splitter 120 can be free-space components or can be fabricated from optical fiber as well-known in the art.

Interim signal 146 enters DFG crystal 130 with second split signal 124. The propagation delays in the paths of the second split signal 124 and interim signal 146 are matched to provide the synchronization of their arrivals at DFG crystal 130. A difference signal 152 having data pattern 112 is generated within DFG crystal 130. The frequency of difference signal 152 is the difference of the frequencies of interim signal 46 and second split signal 124. This difference is expressed in terms of wavelengths as $\lambda_O^{-1}\lambda_I^{-1}-\lambda_S^{-1}$; where $\lambda_O$ is the wavelength of difference signal 152. A band-pass filter 150 removes any residual components of interim signal 142 and second split signal 24 from the output 148 of DFG crystal 130 and transmits only difference signal 152. Difference signal 152 has a wavelength of $\lambda_O$ and data pattern 112.

It should be noted that in addition to those described above, additional electro-optical and optical elements or components can be included in the converter. Thus, the above-described elements can be coupled to one another not only directly but also via one or more additional intermediate elements.

It can be deduced that $\lambda_O=\lambda_P$ from the equations set forth above for wavelengths of interim signal 146 and difference signal 152. This signifies that the output wavelength from converter 100 is identical to the wavelength of pump beam 134, yet the output amplitude replicates the amplitude modulation of input signal 110 (unlike pump beam 134, which is CW). Pump beam source 132 is selected as producing a wavelength at the desired final output wavelength. Although converter 100 can be used for any suitable purpose, if used in optical communications networks presently in commercial use, the wavelengths of input signal 110 and pump beam 134 may be quite close to one another around the 1550 nm, 1310 nm, or 1600 nm bands. In such context, interim signal 146 would have a frequency of around 775 nm, 655 nm, or 800 nm, respectively.

Depolarizer 118 eliminates any plane polarization preference that may be originally present in amplified signal 116. The signal output by depolarizer 118 will have equalized plane polarization components along any pair of mutually perpendicular axes both transverse to the direction of signal propagation. Polarizing splitter 120 receives the polarization-equalized signal output by depolarizer 118 and produces the plane-polarized first and second split signals 122 and 124 with identical intensities. The polarization axes of split signals 122 and 124 are mutually perpendicular and are each transverse to the directions of signal propagation. Split signals 122 and 124 must be respectively coupled into SFG and DFG crystals 128 and 130 in a correctly polarized sense. The first polarized split signal 122 is coupled into SFG crystal 128 in, say, an extraordinary (e) sense, common with the polarization of the plane polarized pump beam 134. The second split signal 124, having an ordinary (o) sense of polarization, is directed through polarization rotator 126, altering by 90 degrees its polarization sense to e, into DFG crystal 130. Into crystal 130 is also directed interim signal 146, which matches first split signal 122 in polarization, mode and phase. Thus, interim signal 146 and second split signal 124 enter DFG crystal 130 with parallel e polarizations.

The optical couplings among the devices of FIG. 1 are conceptually illustrated as lines, some of which have arrowheads indicating the direction of propagation of optical signals or beams, but these couplings can comprise any suitable media known in optical signal technology. The couplings may comprise polarization maintaining single-mode optical fibers, in-substrate channel waveguides, or free-space optical beam couplings. As discussed above, the polarizations of signals and pump beams must be aligned for effective SFG and DFG processes. Thus, the optical couplings carrying split signals 122 and 124, pump beam 134, and interim signal 146 provide polarization maintenance;

that is, the optical waves propagate essentially without loss or distortion of polarization. Polarization-maintaining single mode fibers and waveguides are commercially available and can be utilized for this purpose. Polarization rotator 126 can be, for example, an uninterrupted polarization-maintaining single mode fiber with a 90 degree twist, a half-wave plate, or any other suitable polarization rotating device known in the art.

In the embodiment of the invention illustrated in FIG. 1, the first split signal 122 and pump beam 134 are each coupled to, and separately enter, SFG crystal 128. This arrangement may be appropriate when interband conversion is required. In such an application, optical signal 110 and pump beam 134 are of dissimilar wavelength and can be optimally coupled to SFG crystal 128 through separate waveguides (not shown) within SFG crystal 128. Each waveguide can be adiabatically tapered in width and refractive index along the propagation direction to accommodate first an input wavelength, and finally an output wavelength. The input wavelengths of the separate waveguides within SFG crystal are those of first split signal 122 and pump beam 134. The output wavelengths of the separate waveguides within SFG crystal 128 are each that of the generated interim signal 146.

In applications where first split signal 122 and pump beam 134 are considered intraband signals or otherwise have relatively similar frequencies, they can readily be combined prior to entry into SFG crystal 128. In such embodiments of the invention, first split signal 122 and pump beam 134 can be conveniently coupled to SFG crystal though a single-entry waveguide. Wavelength converter embodiments in which input and pump signals are combined prior to entry into SFG crystals are describd below with regard to FIGS. 2 and 4.

As well-known in the art to which the invention relates, to accomplish the process of three-wave mixing (TWM), the crystalline media of crystals 128 and 130 possess the following properties: 1) high second-order susceptibility, $\chi^{(2)}$; 2) transparency, or very low absorption, at the three wavelengths of the interacting waves; 3) refractive indices in the ordinary and extraordinary senses enabling phase-matching of the waves; and 4) high damage threshold, well above the intensities of the three interacting waves. Crystals 128 and 130 can be made, for example, of such materials as $LiNbO_3$ (LN), $LiTaO_3$ (LT), $KTiOPO_4$ (KTP), or $RbTiAsO_4$ (RTA), possessing $\chi^{(2)}$ in the vicinity of $10^{-7}$ electrostatic units (esu). At this level, the effective nonlinear coefficient and overall efficiency of the interaction in the NLO crystal to generate a third wave can attain a magnitude of approximately $d_{eff}=20$ pm/V and $\eta=100\%/W/cm^2$, respectively. Out of crystal 128 the optical power $P_I$ of interim signal 136 is proportional to the product of the power $P_P$ of pump beam 124 and the power $P_S$ of optical signal 110, and can be calculated by: $P_I=\eta P_S P_P L^2$, where L is the crystal length. Note that the photon flux of interim signal 136 cannot exceed that of optical signal 110. For example, in an embodiment of the invention in which pump beam and optical signal powers are, for example, 40 and 5 mW, respectively, and the crystal has length of 5 cm, the output power would be 5 mW.

The power $P_D$ of difference signal 152 is proportional to the product of the power $P_I$ of interim signal 146 and the power $P_S$ of optical signal 110, and as described above with regard to interim signal 146 can be calculated by: $P_D=\eta P_S P_I L^2$, assuming a similar conversion efficiency and crystal length for both crystals 128 and 130. In an exemplary embodiment of the invention in which interim signal 146 and optical signal 110 are each 5 mW, the power of difference signal 152 is 0.6 mW. One must also consider losses incurred by matching the beams into and out of crystals 120 and 122 and pump depletion, which may account for typically 1–3 dB, reducing the output to 0.5–0.3 mW. On the other hand, conversion efficiency magnitudes of two or three times, and even beyond the $100\%/W/cm^2$, are likely, enabling higher output power.

As known in the art, a crystal material having a high photorefractive coefficient, such as $LiNbO_3$, may be damaged by exposure to high intensity optical beams. For such materials, the photorefractive index decreases with increasing crystal temperature, so long as the increased temperature remains below that which would thermally damage the crystal. As further known in the art, SFG crystal 128 and DFG crystal 130 can each be fabricated of, for example, $LiNbO_3$, and can be heated by suitable means to approximately 80 degrees Celsius during operation of wavelength converter 100. Other materials with low photorefractive coefficient, such as KTP, are not considerably vulnerable to high intensity beams and may be utilized for SFG and DFG crystals 128 and 130 without any means of heating.

As noted above, to induce an effective TWM process, three conditions are maintained: high optical intensity, phase matching between all three waves (two input waves and one generated wave), and correct polarization alignment. Because the output power is proportional to the crystal square length, the high intensity must be maintained over the entire length. This is attained by forming a waveguide in the crystal into which the optical beams are introduced. For optimum performance, the waveguide is designed to support the propagation of a single mode beam polarized in an extraordinary sense. As long as the wavelengths of signal 110 and pump beam 134 are similar, their combination and introduction into a common waveguide is straightforward. If their wavelengths substantially differ, their combination can be accomplished in a mode-matching manner, such that the two beams are introduced into two distinct waveguides in a crystal. The waveguide in which the shorter wavelength propagates is adiabatically tapered to accommodate the output wave, and then coupled with the other waveguide.

Phase matching can be induced by periodically poling crystals 128 and 130. Periodic poling means that the crystal is structured in alternating polarity orientations, each polarity possessing a different index of refraction at the various wavelengths and polarizations. While one wave leads the other in the first of the two zones in the period, it trails the other in the second zone. In other words, the nonlinear susceptibility is modulated periodically to compensate for dispersion. This technique, referred to in the art as Quasi Phase-Matching (QPM), holds as long as the period is shorter than the coherence length of each of the interacting waves. Derived from the equation of momentum conservation one can compute the period length $\Lambda^{-1}=(2\pi)^{-1}(k_I-k_S-k_P-\Delta k)$ where $\Delta k$ is the phase mismatch, and $k_i$ is the wave vector of the $i^{th}$ component, i.e. $k_i=2\pi n_i/c$, where $n_i$ is the refraction index for the $i^{th}$ component and c is the speed of light in vacuum. In the illustrated embodiment of the invention $\Delta k=0$, and the interaction of the waves is then non-critically matched. For non-critical phase matching in an optical communications network of the type currently in commercial use, the wavelengths of pump signal 134, signal 110, and interim signal 146 may be 1550, 1540 and 772.5 nm, respectively, with all waves linearly polarized in the extraordinary sense. In this case, the resulting modulation period in PPLN, KTP and RTA crystals is 16.6, 32.8 and 31.9 μm, respectively. As known in the art, the poling can be realized either by chemical means, such as ion exchange, or by electrical means, where an electric field is used to pole the crystal directionality at the required period.

To enhance acceptance of signals of arbitrary wavelength into SFG crystal 128, spectral acceptance can be expanded. This can be accomplished by constructing a multi-periodically poled crystal or a cascade structure, where the periodic structure is perturbed every so often, changing the period or phase. The resulting acceptance bands are compatible with a wide spectral window, though at the expense of the conversion efficiency. The peturbation or chirping, as it is sometimes referred to in the art, increases the harmonics of the poling frequency. The poling can be in accordance with a suitable mathematical function that provides such harmonics, such as a harmonically changing period.

In the illustrated embodiment, pump beam 134 is coupled into SFG crystal 128 such as to form a fundamental transverse mode. Split signal 122 is coupled in a similar manner into crystal 128, and so the TWM process is conducted very efficiently on the fundamental modes. The coupling into DFG crystal 130 is similar, but the two inputs are kept synchronous relative to their temporal bit structure, i.e., relative to the bits of data pattern 112. In the illustrated embodiment, the coupling fiber optics into and out of SFG and DFG crystals 128 and 130 are of the polarization-preserving kind.

Due to the $\chi^{(2)}$ values of the NLO crystals, relatively high intensities are needed to initiate and maintain the SFG and DFG processes, of the order of 100 KW/cm$^2$. In a waveguide formation with a cross-section of a few square microns this militates pump laser powers of a few tens of milliwatts. The processes are very efficient, with typical conversion factors of 260%/W, enabling a wavelength conversion without overall losses.

Figure 2:
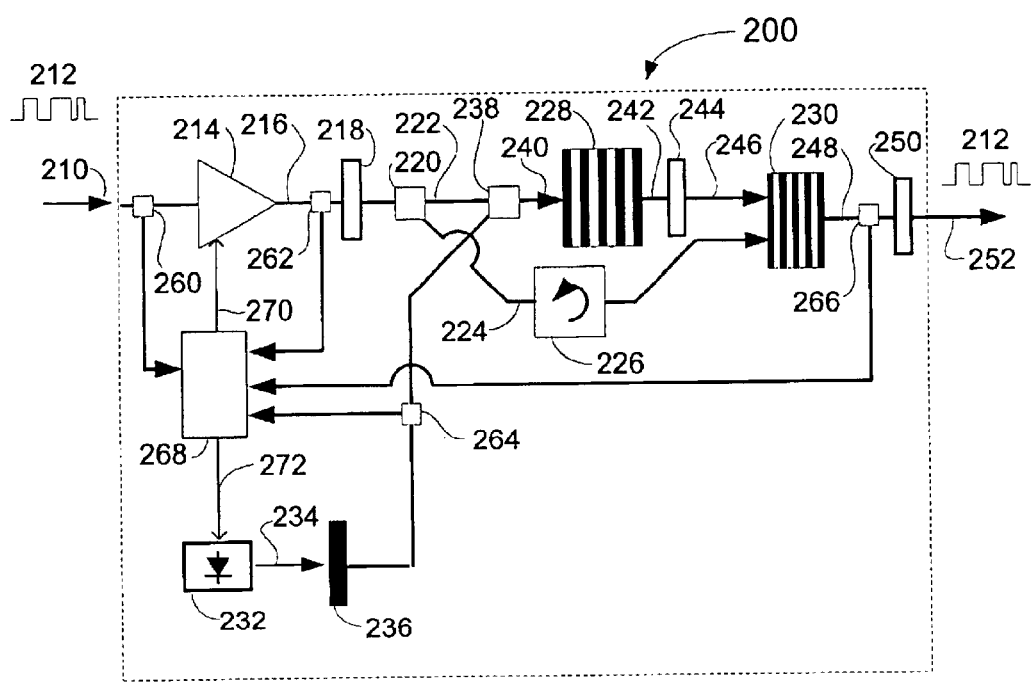
FIG. 2 is a block diagram of another embodiment of a single-channel wavelength converter with a fixed output amplitude.

An alternative embodiment of the invention, featuring feedback-stabilized or controlled output amplitude, is illustrated in FIG. 2. The optical converter 200 receives as input an optical signal 210 with a data pattern 212. An optical amplifier 214 produces an amplified signal 216 at the wavelength of the optical signal 210 with data pattern 212. A depolarizer 218 equalizes any polarization components of amplified signal 216. A polarizing splitter 220 receives amplified signal 216 and outputs first and second split signals 222 and 224 each with data pattern 212. Second split signal 224 is coupled to DFG crystal 230 through the polarization rotator 226. The polarization of second split signal 224 is rotated by polarization rotator 226 in the same manner and with the same purpose as the rotation of the polarization of second split signal 124 by the polarization rotator 126 as detailed above in the description of FIG. 1.

A CW optical pump beam source 232 provides a pump beam 234 which enters converter 200 through a laser-beam isolator 236. Pump beam 234 and first split signal 222 each enter each enter a combiner 238, and a combined signal 240 enters an SFG crystal 228. The combined signal 240 comprises the pump beam 234 and first split signal 222. Combiner 238 may be an optical fiber-based combiner, a dichroic mirror, or any other suitable device known in the art. Efficient combination of pump beam 234 and first split signal 222 into a single optical fiber or waveguide is possible in such applications where intraband conversion is desired, i.e., where pump beam 234 and first split signal 222 have similar wavelengths.

An interim signal 246 having data pattern 212 is generated by the interaction of pump beam 234 and first split signal 222 components of combined signal 240 within SFG crystal 228 by the SFG process in the same manner as described above with regard to SFG crystal 128 in FIG. 1. The frequency of interim signal 246 is the sum of the frequencies of pump beam 234 and optical signal 210 for the reasons described above. The high-pass filter 244 removes any residual components of pump beam 234 and first split signal 222 from the output 242 of SFG crystal 228 and transmits interim signal 246.

Interim signal 246 enters DFG crystal 230 with second split signal 224. The propagation delays in the paths of the second split signal 224 and interim signal 246 are matched to provide the synchronization of their arrivals at DFG crystal 230. A difference signal 252 having data pattern 212 is generated within second crystal 230 through the DFG process in the same manner as described above with regard to SFG crystal 228 in FIG. 1. The frequency of difference signal 252 is the difference of the frequencies of interim signal 246 and second split signal 224 for the reasons described above. The band-pass filter 250 removes any residual components of interim signal 246 and second split signal 224 from the output 248 of DFG crystal 230 and transmits only difference signal 252. Converter 200 outputs difference signal 252, which has a wavelength of $\lambda_O$ and data pattern 212.

The embodiment illustrated in FIG. 2 provides stable output intensity by including a controller 268. Several optical tap-offs 260, 262, 264 and 266 provide optical signals for intensity measurements at controller 268. Controller 268 varies the gain at optical amplifier 214 and the intensity of pump beam 234 in response to fluctuations in the intensity of the output 248 of DFG crystal 230. Tap-offs 262 and 264 respectively route samples of amplified signal 216, and pump beam 234 to controller 268. Controller 268 includes photodetectors (not shown) to monitor these optical samples. In accordance with an algorithm described below, controller 268 produces control signals via electrical connections 270 and 272 that control the gain of amplifier 214 and pump beam source 232. An increase/decrease in the current carried by electrical connection 270 causes an increase/decrease in the gain of optical amplifier 216, and thus an increase/decrease in the amplitude of amplified signal 216. Similarly, an increase/decrease in the current carried by electrical connection 272 causes an increase/decrease in the intensity of the pump beam 234. A tap-off 266 routes a sample of output 248 of DFG crystal 230 to controller 268, which varies the current carried in electrical connections 270 and 272 in order to maintain constant optical power at tap-off 266. A tap-off 260 routes a sample of input signal 210 to controller 268 so that unacceptable fluctuations or drifts in the power of input signal 210 may be diagnosed. Tap-offs 260, 262, 264, and 266 each routes an optical sample representing only a small proportion (e.g., 5%) of the optical intensity of the sampled beam to the controller 268. Therefore, little conversion efficiency is lost due to the routing of optical power to controller 268.

Figure 3:
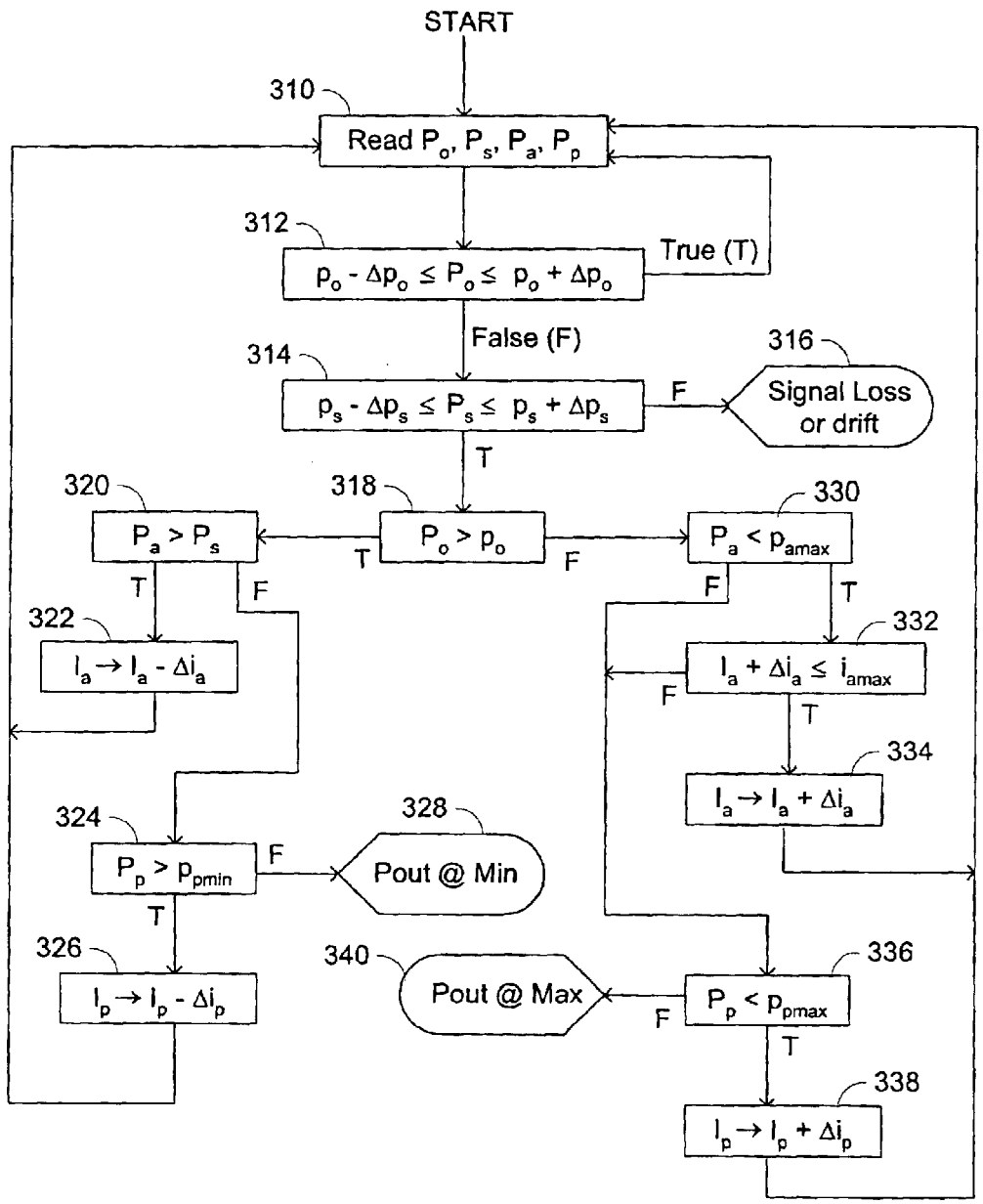
FIG. 3 is a flow chart of a method of stabilizing the output amplitude of a single-channel wavelength converter.

An exemplary algorithm under which controller 268 can operate is illustrated in FIG. 3. Controller 268 can include a suitable microprocessor or similar device with associated memory (not shown), programmed to effect the algorithm. Such control circuitry is well-known to persons skilled in the art and therefore not described in detail in this patent specification.

As illustrated in FIG. 3, the algorithm begins at step 310, where controller 268 samples the power of the input signal ($P_s$), the power output of the amplifier ($P_a$), the power of the pump beam ($P_p$), and output optical intensity ($P_o$). These samples are respectively provided by tap-offs 260, 262, 264, and 266. Photodetectors or similar conversion devices (not shown) in controller 268 convert the optical samples to electrical signals representing power. At step 312, controller 268 compares $P_o$ to a predetermined desired output power $p_o$ with tolerance $\Delta p_o$. If $P_o$ is found within the range $p_o \pm \Delta p_o$ then a true condition of satisfactory output power is determined at step 312 and the algorithm recycles to step 310. If $P_o$ is found outside of the range $p_o \pm \Delta p_o$ then a false condition of unsatisfactory output power is determined at step 312 and the algorithm continues with step 314.

At step 314, $P_s$ is compared to a predetermined desired signal power $p_s$ with tolerance $\Delta p_s$. If $P_s$ is found within the range $p_s \pm \Delta p_s$ then a true condition of satisfactory signal power is determined at step 314 and the algorithm continues to step 318. If $P_s$ is found outside of the range $p_s \pm \Delta p_s$ then a false condition of unsatisfactory signal power is determined at step 314 and the algorithm continues to the termination step 316 indicating that the input signal has been lost or has drifted in intensity beyond the acceptable range $p_s \pm \Delta p_s$.

At step 318, unsatisfactory output power $P_o$ is compared to the desired $p_o$. If $P_o$ is greater than $p_o$ then a true condition of unacceptably high $P_o$ is determined at step 318 and the algorithm continues along the left side of FIG. 3, where $P_o$ may be decreased by adjustment in the electrical current to the amplifier or the electrical current to the pump source.

A true condition at step 318 is followed by step 320 where $P_a$ is compared to $P_s$. The optical amplifier 216 of FIG. 2 is provided to increase the incoming signal power by a multiplicative factor, the gain, which is expected to have a value of 1.0 or greater such that $P_a$ should be greater than $P_s$ in expected operation of the amplifier. If $P_a$ is greater than $P_s$ then a true condition is determined at step 320 and the algorithm continues with to step 322. At step 322 the electrical current $I_a$, which powers the amplifier, is reduced by a predetermined increment $\Delta i_a$ in order to decrease the amplifier gain. Step 322 is followed by a recycling of the algorithm to step 310. If $P_a$ is not greater than $P_s$ then a false condition is determined at step 320 and the algorithm continues with step 324 and no adjustment of the current $I_a$ will be sought to remedy the unacceptably high output power $P_o$.

At step 324, the pump beam power $P_p$ is compared to a predetermined desired minimum pump beam power $p_{pmin}$. If $P_p$ is greater than $p_{pmin}$ then a true condition is determined at step 324 and the algorithm continues with step 326 where the electrical current $I_p$, which powers the pump beam source, is reduced by a predetermined increment $\Delta i_p$ in order to decrease the pump beam intensity. Step 326 is followed by a recycling of the algorithm to step 310. If $P_p$ is not greater than $p_{pmin}$ then a false condition is determined at step 324 and the algorithm continues to the termination step 328 indicating that though the output power $P_o$ has been determined to be unacceptably high, $P_o$ has been minimized within the ability of the algorithm and no adjustments can be appropriately made of the current $I_a$ to the amplifier or the current $I_p$ to the pump beam source.

Referring again to step 318, unsatisfactory output power $P_o$ is compared to the desired $p_o$. If $P_o$ is not greater than $p_o$ then a false condition of unacceptably low $P_o$ is determined at step 318 and the algorithm continues along the right side of FIG. 3, where $P_o$ may be increased by adjustment of the electrical current to the amplifier or the electrical current to the pump source.

A false condition at step 318 is followed by step 330 where the power output $P_a$ of the amplifier is compared to a maximum value ppmax predetermined for the reliable operation of the amplifier. If $P_a$ is not less than ppmax then a false condition is determined at step 330 and the algorithm continues with step 336. If $P_a$ is less than $p_{pmax}$ then a true condition is determined at the step 330 and the algorithm continues with step 332. A true condition at step 330 indicates that the amplifier gain may be increased in order to increase $P_a$ and thereby $P_o$. Step 332 is provided for the reliable operation and protection of the amplifier. The electrical current $I_a$ should not exceed a predetermined maximum value $i_{amax}$. Thus, at step 332, the quantity $I_a + \Delta i_a$ is compared to $i_{amax}$. If $I_a + \Delta i_a$ is less than or equal to $i_{amax}$ then a true condition is determined at step 332 indicating that the amplifier current may be safely increased. At true condition at step 332 is followed by step 334 where $I_a$ is increased by $\Delta i_a$ in order to increase the amplifier gain and thereby perhaps increase $P_o$. Step 334 is followed by a recycling of the algorithm to step 310. If $I_a + \Delta i_a$ is greater than $_{amax}$ then a false condition is determined at step 332 indicating that the amplifier current may not be safely increased and the algorithm proceeds with step 336.

At step 336, the power output $P_p$ of the pump beam source is compared to $p_{pmax}$, a predetermined value of maximum power for stable operation. If $P_p$ is less than $p_{pmax}$ then a true condition is determined at step 336 indicating that the pump beam source output power may be increased and the algorithm continues with step 338 where $I_p$ is increased by $\Delta i_p$. Step 338 is followed by a recycling of the algorithm to step 310. If $P_p$ is not below the maximum allowable $p_{pmax}$, then a false condition is determined at step 336 and the algorithm continues to termination step 340 indicating that though the output power $P_o$ has been determined to be unacceptably low, $P_o$ has been maximized within the ability of the algorithm and no adjustments can be appropriately made of the current $I_a$ to the amplifier or the current $I_p$ to the pump beam source.

At any time, if termination steps 316, 328, or 340 are reached, the algorithm terminates with a failure to maintain the output power $P_o$ within the predetermined desired range $p_o \pm \Delta p_o$. The controller 266 of FIG. 2 may provide external communication means (not shown) such as an electrical signal output to alert a user or system of the detected fault.

The control algorithm illustrated in FIG. 3 and described above is suitable for slow control responsive to, and regulating, average optical power determinations of optical binary signals.

Figure 4:
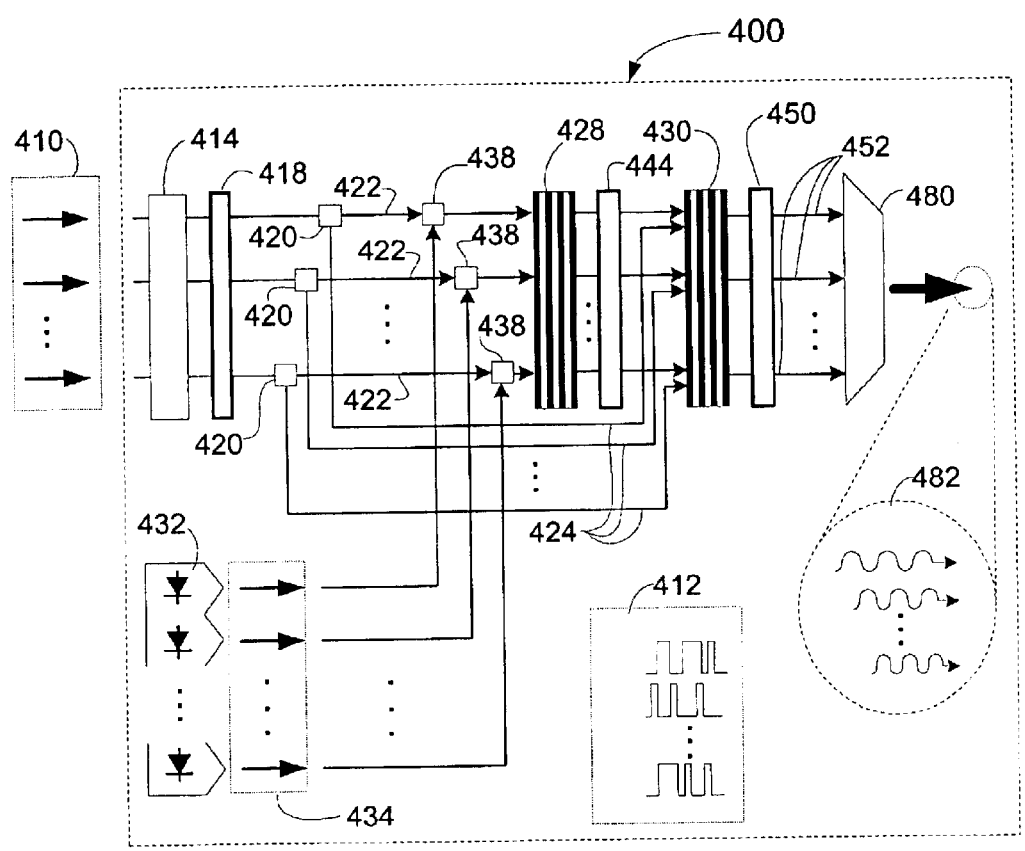
FIG. 4 is a block diagram of a multi-channel wavelength converter.

It should be noted that any embodiment of the invention, including those described above with regard to FIG. 1 or 2, can include any desired number of channels. The embodiments illustrated in FIGS. 1 and 2 relate to only a single channel for purposes of illustration and clarity. Thus, instead of the converter having a single one of an element described above, it can have multiple ones of that element. Such a multi-channel wavelength converter 400 is illustrated in FIG. 4. As the principles of operation and constituent elements of such a multi-channel converter 400 are essentially the same as those described above with regard to converters 100 and 200, they are not described in similar detail below.

Converter 400 receives as input the optical signal set 410. Signal set 410 can carry simultaneously a plurality of optical data transmission signals each at a particular wavelength and data pattern. Each element of the data pattern set 412 corresponds to a particular wavelength signal of signal set 410. A multi-channel optical amplifier 414 boosts the amplitude of each signal of signal set 410. A depolarizer 418 equalizes any polarization components of amplified signals. Each of polarizing splitters 420 receives one of the amplified signals and outputs one each of first and second split signals 422 and 424. A multi-channel CW optical pump beam source 432 provides a plurality of pump beams 434, each at a particular pump beam wavelength. The embodiment illustrated in the FIG. 4 provides that each of first split signals 422 is combined with one of pump beams 434 by one of combiners 438. Such an arrangement can be appropriate for intraband wavelength conversion or other purposes. Alternately, each split signal 422 and pump beam 434 can be coupled separately into SFG crystal 428 as may be appropriate for interband conversion, as discussed above with regard to converter 100 of FIG. 1.

As illustrated in FIG. 4, each of combiners 438 emits a combined signal, which enters an SFG crystal 428. Interim signals 446 are each generated from the interaction of a single one of split signals 422 and a corresponding one of pump beams 434 within SFG crystal 428 by the SFG process. The frequency of each of the interim signals 446 is the sum of the frequencies of the single one of split signals 422 and corresponding one of pump beams 434 in the same manner as described above with regard to FIG. 1. The high-pass filter 444 removes any residual pump beam and first split signal components from the outputs of SFG crystal 428 and transmits interim signals 446.

Interim signals 446 enter DFG crystal 430, each with a corresponding one of second split signals 424. The propagation delays in the paths of the second split signals 424 and interim signals 446 are matched to provide the synchronization of their arrivals at DFG crystal 430. Difference signals 452 are each generated by the DFG process within DFG crystal 430 from one of interim signals 446 and corresponding one of second split signals 424. The frequency of each of difference signals 452 is the difference of the frequencies of the one of interim signals 446 and corresponding one of second split signals 424 for the reasons described above with regard to FIG. 1. The bandpass filter 450 removes any residual components of interim signals 446 and second split signals 424 from the outputs of DFG crystal 430, and transmits only difference signals 452. A multiplexer 480 combines difference signals 452 into a single multi-channel converter output signal 482. Multi-channel output signal 482 comprises a plurality of signals as illustrated, each with a particular wavelength and data pattern. The wavelengths of output signal 482 are those provided by the multi-channel pump beam source 432. Thus, the converter output signal 482 carries the data of the data pattern set 412 at the wavelengths of the pump beam source 432.

As the microdomain poling periodicity of SFG crystal 428 and DFG crystal 430 may be selected to provide QPM among the interacting waves, crystals 428 and 430 may be selected from those commercially available which provide separate poling periodicity in adjacent regions.

As described above, FIG. 1 illustrates a single-channel wavelength converter 100, FIG. 2 illustrates an output-stabilized controlled wavelength converter 200, and FIG. 4 illustrates a multi-channel wavelength converter 400. Nevertheless, it should be recognized that elements and features described above with regard to each of these embodiments can be combined with those described above with regard to the other embodiments or with any other elements and features known in the art, in any suitable manner and in any suitable combination, to give rise to still further embodiments of the invention.

It will be apparent to those skilled in the art that various modifications and variations can be made in the present invention without departing from the scope or spirit of the invention. Other embodiments of the invention will be apparent to those skilled in the art as a result of consideration of the specification and practice of the invention disclosed herein. It is intended that the specification and examples be considered as exemplary only, with the true scope and spirit of the invention being indicated by the following claims.

What is claimed is:

1. An optical wavelength converter, comprising:

an optical sum frequency generator;

an optical difference frequency generator;

a continuous-wave optical beam source;

a splitter having an input to a converter input and having a first splitter output and a second splitter output;

a first combiner having a first input coupled to the first splitter output, a second input coupled to an output of the continuous-wave optical beam source, and an output coupled to an input of the optical sum frequency generator, the first combiner being integrally formed in a crystal with the optical sum frequency generator and a second combiner having a first input coupled to an output of the optical sum frequency generator, a second input coupled to the second splitter output, and an output coupled to the input of the optical difference generator.

2. The optical wavelength converter claimed in claim 1, wherein:

at least part of the crystal optical sum frequency generator is a three-wave mixing periodically-poled crystal; and the optical difference frequency generator comprises a three-wave mixing periodically-poled crystal.

3. The optical wavelength converter claimed in claim 1, wherein at least part of the crystal associated with the optical sum frequency generator is poled in accordance with a poling function that includes harmonics of at least one predetermined poling frequency.

4. The optical wavelength converter claimed in claim 1, further comprising a depolarizer coupled between the converter input and the splitter.

5. The optical wavelength converter claimed it claim 1, wherein the optical beam source is a continuous-wave pump laser.

6. The optical wavelength converter claimed in claim 5, wherein the laser is a single-frequency laser diode.

7. The optical wavelength converter claimed in claim 5, wherein the laser is a diffraction feedback laser diode.

8. The optical wavelength converter claimed in claim 5, wherein the laser is tunable.

9. The optical wavelength converter claimed in claim 1, wherein the second combiner is integrally formed in a crystal with the optical difference frequency generator.

10. The optical wavelength converter claimed in claim 9, wherein the second combiner comprises two waveguides having outputs coupled together, and at least one of the two waveguides is adiabatically tapered to match modes propagating in one of the two waveguides to modes propagating in the other of the two waveguides.

11. The optical wavelength converter claimed in claim 1, wherein the first combiner comprises two waveguides having outputs coupled together, and at least one of the two waveguides is adiabatically tapered to match modes propagating in one of the two waveguides to modes propagating in the other of the two waveguides.

12. The optical wavelength converter claimed in claim 1, wherein the splitter produces two output signals having linear, orthogonal polarizations.

13. The optical wavelength converter claimed in claim 12, wherein:
polarization-maintaining single-mode fiber couples the first input of the first combiner to the first splitter output; and
polarization-maintaining single-mode fiber couples the second input of the first combiner to the output of the continuous-wave optical beam source.

14. The optical wavelength converter claimed in claim 13, further comprising a polarization rotator coupling the second splitter output to the second input of the second combiner.

15. The optical wavelength converter claimed in claim 1, further comprising a high-pass filter coupling the output of the optical sum frequency generator to the first input of the second combiner, the high-pass filter having a cutoff frequency of approximately the sum of a frequency of the optical beam source and a frequency of a signal received at the converter input.

16. The optical wavelength converter claimed in claim 1, further comprising a bandpass filter coupling the output of the optical difference frequency generator to the converter output, the bandpass filter having a passband centered at approximately the frequency of the optical beam source.

17. The optical wavelength converter claimed in claim 1, further comprising amplitude control circuitry including a controller coupled a feedback relation in a signal path of the optical wavelength converter.

18. The optical wavelength converter claimed in claim 17, further comprising an amplifier coupling the converter input to the input of the splitter, wherein the controller has an input coupled to an output of the amplifier and a first output coupled to an input of the amplifier to provide feedback-controlled amplitude adjustment of the amplifier.

19. The optical wavelength converter claimed in claim 18, wherein the controller has a second output coupled to an input of the optical beam source to provide feedback-controlled amplitude adjustment of the optical beam source when adjustment of the amplifier is insufficient to achieve stability.

20. The optical wavelength converter claimed in claim 18, wherein the controller has an input coupled to an output of the difference frequency generator to provide feedback-controlled amplitude adjustment of the amplifier.

21. The optical wavelength converter claimed in claim 20, wherein the controller has a second output coupled to an input of the optical beam source to provide feedback-controlled amplitude adjustment of the optical beam source when adjustment of the amplifier as insufficient to achieve stability.

22. The optical wavelength converter claimed in claim 17, further comprising an amplifier coupling the converter input to the input of the splitter, wherein the controller has an input coupled to an output of the optical beam source and a first output coupled to a gain input of the amplifier to provide feedback-controlled amplitude adjustment of the amplifier.

23. The optical wavelength converter claimed in claim 22, wherein the controller has a second output coupled to an input of the optical beam source to provide feedback-controlled amplitude adjustment of the optical beam source when adjustment of the amplifier is insufficient to achieve stability.

24. An optical wavelength converter, comprising:
a plurality of optical sum frequency generators integrally formed with each other in a crystal;
a plurality of optical difference frequency generators integrally formed with each other in a crystal;
a plurality of continuous-wave optical beam sources;
a plurality of splitters, each having an input coupled to one of a plurality of converter inputs and having a first splitter output and a second splitter output;
a plurality of first combiners, each having a first input coupled to a corresponding one of the first splitter outputs, a second input coupled to an output of a corresponding one of the continuous-wave optical beam sources, and an output coupled to an input of a corresponding one of the optical sum frequency generators;
a plurality of second combiners, each having a first input coupled to an output of a corresponding one of the optical sum frequency generators, a second input coupled to a corresponding one of the second splitter outputs, and an output coupled to an input of a corresponding one of the optical difference generators; and
a multiplexer having a plurality of inputs, each coupled to an output of a corresponding one of the difference frequency generators, and having a converter output.

25. The optical wavelength converter claimed in claim 24, wherein:
the crystal of the optical sum frequency generators comprises a three-wave mixing periodically-poled crystal; and
the crystal of the optical difference frequency generators comprises a three-wave mixing periodically-poled crystal.

26. The optical wavelength converter claimed in claim 24, wherein each of the first combiners as integrally formal in the crystal with each of the optical sum frequency generators.

27. The optical wavelength converter claimed in claim 24, wherein each or the second combiners is integrally formed in the crystal with each of the optical difference frequency generators.

28. A method for converting a frequency of an optical input beam carrying a communications signal, comprising:
receiving the optical input beam at a converter input;
producing a continuous-wave beam;
splitting the optical input beam into first and second split beams;
producing a sum signal having a frequency equal to a sum of a frequency of the first split beam and a frequency of the continuous-wave beam;
producing a difference signal having a frequency equal to a difference between a frequency of the sum signal and a frequency of the second split beam;
rotating a polarization of the second split beam; and
outputting the difference signal at a converter output;
whereby the signal output at the converter output represents a modulation of the continuous-wave beam with the communications signal.

29. The method claimed in claim 28, further comprising the step of high-pass filtering the sum signal at a cutoff frequency of approximately the sum of a frequency of the optical input beam and a frequency of the continuous-wave beam.

30. The method claimed in claim 28, further comprising the step of bandpassfiltering the difference signal at a passband frequency centered at approximately a frequency of the continuous-wave beam.

31. The method claimed in claim 28, further comprising the step of stabilizing an amplitude of a signal responsive to one of said optical input beam and said continuous-wave beam in response to a feedback signal.

32. The method claimed in claim 28, further comprising the step of depolarizing the optical input beam before the splitting step.

* * * * *